3,433,158
SOLID PROPELLANT GRAIN WITH SURFACE BONDED BURNING INHIBITOR COMPOSITION OF HYDROXY-TERMINATED POLYBUTADIENE
Everette M. Pierce, Somerville, Ala., assignor to the United States of America as represented by the Secretary of the Army
No Drawing. Filed Feb. 10, 1966, Ser. No. 526,635
U.S. Cl. 102—103     5 Claims
Int. Cl. C06b *19/02*; F42b *1/00*

ABSTRACT OF THE DISCLOSURE

An inhibitor composition, for substances such as wood, metal and propellants, that includes an intimate mixture of hydroxy-terminated polybutadiene, an organic diisocyanate, a metal oxide or metal salt catalyst and a heat resistant agent such as refractory oxides, carbon and asbestos.

---

Inhibitors are used in solid propellant grains to limit the exposed burning surface. An inhibitor composition which is essentially inert to combustion or which burns very slowly is applied as a thin layer on the surface where burning is to be prevented. The inhibitor should be capable of forming a strongly adhesive bond with the propellant and should have sufficient strength to maintain its integrity under the extreme conditions of temperature, gas pressure and mechanical stress ot which it is subjected during burning of the propellant. In some applications, the inhibitor is subjected to particularly strong mechanical stresses, for example, for gyroscope-actuating propellant grains which rotate at high speeds during burning.

Various polymeric materials and resin-base compositions have been used as inhibitors, but serious disadvantages have been presented. Some of the previously used polymers require a volatile solvent for application to the grain, and evaporation of the solvent during curing produces gas pockets or voids in the grain. Accumulation of gases in these areas during burning can produce an explosion or erratic performance. Other polymers have avoided this result, but a prolonged curing process, for example, 2 to 10 days at a temperature of 135° F., is required. In addition, many of these compositions fail to stand up under the extreme conditions encountered in propellant burning.

It is, therefore, an object of this invention to provide an inhibitor composition for solid propellant grains.

Another object is to provide an inhibitor composition having high strength and resistance to combustion when cured.

Still another object is to provide a rapidly cured inhibitor composition which can be applied without use of a solvent.

Other objects and advantages of this invention will be apparent from the following detailed description.

In the present invention there is provided a novel inhibitor having the following composition, in weight percent: hydroxy-terminated polybutadiene, 80 to 90; an organic diisocyanate 2 to 10; a metal oxide or metal salt catalyst, at least 0.04; and a heat-resistant agent, 1 to 15. This composition has superior heat-resistance, and it maintains its integrity during burning of the adjoining propellant grain. A strongly adhesive bond is formed between this composition and the propellant grain by a simple low-temperature curing process, and no solvent is required for applying the inhibitor.

Although this invention is not to be understood as limited to a particular theory, it is postulated that the rapid curing and superior bonding properties of this inhibitor result from crosslinking of the hydroxy-terminated polybutadiene with the binder, for example, nitrocellulose, in the solid propellant to which the inhibitor is applied.

The hydroxy-terminated polybutadiene component in the present invention may be represented by the following formula:

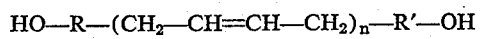

where R and R' may be any organic radicals which may be used in initiating polymerization of butadiene and which facilitate attaching terminal hydroxy groups, and where $n$ is from 45 to 80. The molecular weight of the polymers included in this formula is from about 2500 to 4000. This component is provided in the inhibitor composition at a proportion of 80 to 90 weight percent.

An organic diisocyanate, which is required for curing of the composition, is provided at a proportion of 2 to 10 weight percent. Any diisocyanate having the general formula

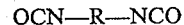

in which R is an organic radical having two valences available for attachment of the two NCO groups may be used. Hexamethylene diisocyanate and toluene diisocyanate are preferred. The amount of this component may be varied to obtain the desired physical properties with stronger, more rigid compositions being obtained at the higher proportions.

A metal oxide or salt catalyst is employed at a proportion of at least 0.04, and preferably 0.04 to 0.15 weight percent to obtain a rapid curing reaction. Any of the previous catalysts for the reaction of diisocyanates with hydroxy groups which are compatible with the remaining ingredients can be used. Metal oxides or salts such as ferric oxide, lead stannate, red lead and ferric acetyl acetonate can be used, with the latter being preferred.

A finely divided heat-resistant agent is provided in the composition at a proportion of 1 to 15 weight percent. Any of the previously used heat-resistant agents such as refractory oxides and carbon may be employed, and silica, carbon black and asbestos are preferred. The amount of this component in the composition may be varied, depending on the extent of heat-resistance desired. A higher degree of heat-resistance is obtained with longer amounts.

A particularly preferred inhibitor composition comprises in weight percent, hydroxy-terminated polybutadiene 84; hexamethylene diisocyanate, 7; silica, 9; and ferric acetyl acetonate, 0.08.

The compositions of this invention are readily prepared by mixing the components at room temperature in conventional equipment for a period of about ten minutes. The mixture begins to harden, and after about 30 to 40 minutes, it has the consistency of heavy grease.

The inhibitor, while having a grease-like consistency, can be applied to the surface of the solid propellant by brushing or similar means such as a spatula. It can also be forced into crevices, cracks or voids with a pressure gun such as a grease or calking gun. For inhibition of exposed propellant grain surfaces, a layer about 0.04 to 0.05 inch thick is preferred, and a thickness from 0.02 to 0.25 inch can be used. The inhibitor can be applied to any surface where burning is to be prevented, as required by the design of the particular propellant grain. For example, it can be applied to the surface of an internal perforation where burning only from the end of the grain is desired, the perforation being provided to strengthen the grain.

After application, the inhibitor is cured by allowing it to stand. A period of 24 to 48 hours is sufficient at room temperature. More rapid curing can be obtained by mild heating, for example, heating overnight at a temperature of about 120° F.

The inhibitor of the present invention is broadly applicable to any of the solid propellant compositions to current use since if form a strongly adhesive bond with any of these materials. In particular, the solid propellant can be of the double-base type having plasticized nitrocellulose as binder or of the composite type having a polybutadiene or polybutadiene-acrylic acid binder.

Although the inhibitor composition is described above, primarily with reference to its use in solid propellant grains, it is not to be understood as so limited. This composition also forms a strongly adhesive bond with wood and metals so that it is widely useful as an adhesive.

The invention is illustrated by the following example.

Example

The following ingredients, in weight percent, were mixed to form an inhibitor composition: hydroxy-terminated polybutadiene, 84; hexamethylene diisocyanate, 7; silica (Silicon "S") 9; and ferric acetyl acetonate, 0.08. The mixture was applied as a thin layer on double-base propellants of widely varying composition, some of the propellants containing added aluminum metal fuel and ammonium perchlorate oxidizer. A strongly adhesive bond was obtained in each case. Propellant grains having a layer of this inhibitor applied to the surface in varying configurations were ignited and fully burned. The layer of inhibitor burned only slightly and remained intact after all of the propellant was burned. In some instances, a toroid-shaped propellant grain having this inhibitor applied to a portion of its surface was rotated at a speed of 12,000 revolutions per minute. The inhibitor layer maintained its integrity even under these severe conditions.

The above example is merely illustrative and is not to be understood as limiting the scope of the invention which is limited only as indicated by the appended claims.

What is claimed is:

1. An inhibitor composition bonded to a solid propellant surface to inhibit burning at said solid propellant surface, said inhibitor composition consisting of an intimate mixture of 80 to 90 weight percent hydroxy-terminated polybutadiene, 2 to 10 weight percent organic diisocyanate, at least 0.04 weight percent metal oxide or metal salt catalyst and 1 to 15 weight percent heat-resistant agent of the group consisting of refractory oxide, carbon and asbestos.

2. The inhibitor composition of claim 1 wherein said heat-resistant agent is silica or carbon black.

3. The inhibitor composition of claim 2 wherein said organic diisocyanate is hexamethylene diisocyanate or toluene diisocyanate.

4. The inhibitor composition of claim 3 wherein said catalyst is ferric oxide, lead stannate, red lead or ferric acetyl acetonate.

5. The inhibitor composition of claim 4 wherein the amount said hydroxy-terminated polybutadiene is about 84 weight percent, the amount of said diisocyanate is about 7 weight percent, the amount of said heat-resistant agent is about 9 weight percent, and the amount of said catalyst is about 0.08 weight percent.

References Cited

UNITED STATES PATENTS

| | | | |
|---|---|---|---|
| 3,086,895 | 4/1963 | Schaeffer | 149—19 |
| 3,177,190 | 4/1965 | Hsieh | 260—94.2 |
| 3,022,149 | 2/1962 | Cramer | 149—19 |
| 3,215,028 | 11/1965 | Pitchford et al. | 86—1 |
| 3,215,648 | 11/1965 | Duffy et al. | 260—2.5 |
| 3,257,248 | 6/1966 | Short et al. | 149—19 |
| 3,301,785 | 1/1967 | Ratliff et al. | 252—62 |
| 3,305,523 | 2/1967 | Burnside | 260—46.5 |

BENJAMIN R. PADGETT, *Primary Examiner.*

U.S. Cl. X.R.

86—1; 117—137; 149—3, 109; 178—6.7; 315—22